US008848219B2

(12) United States Patent
Yamamichi

(10) Patent No.: US 8,848,219 B2
(45) Date of Patent: Sep. 30, 2014

(54) PRINTING CONTROL APPARATUS, PRINTING CONTROL METHOD, AND PROGRAM FOR REDUCING THE NUMBER OF TIMES OF SHIFTING A PRINTING APPARATUS TO THE STANDBY STATE TO REDUCE POWER CONSUMPTION

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 13/006,926

(22) Filed: Jan. 14, 2011

(65) Prior Publication Data

US 2011/0176826 A1 Jul. 21, 2011

(30) Foreign Application Priority Data

Jan. 19, 2010 (JP) ................................ 2010-009378

(51) Int. Cl.

| | |
|---|---|
| ***G06F 3/12*** | (2006.01) |
| ***G03G 15/00*** | (2006.01) |
| *G06K 15/00* | (2006.01) |

(52) U.S. Cl.

CPC .. *G03G 15/5004* (2013.01); *G03G 2215/00126* (2013.01); *G03G 15/5075* (2013.01)

USPC ........................................ 358/1.15; 358/1.14

(58) Field of Classification Search

USPC ............. 358/1.1, 1, 9, 1.12, 1.13, 1.14, 1.15, 358/1.18; 709/203, 206; 399/83

See application file for complete search history.

(56) References Cited

U.S. PATENT DOCUMENTS

| | | | | |
|---|---|---|---|---|
| 6,452,692 | B1 * | 9/2002 | Yacoub | 358/1.15 |
| 7,499,190 | B2 * | 3/2009 | Noda | 358/1.14 |
| 7,864,348 | B2 * | 1/2011 | Suzuki | 358/1.13 |
| 8,270,851 | B2 * | 9/2012 | Yamamichi | 399/8 |
| 2002/0089688 | A1 * | 7/2002 | Ferlitsch et al. | 358/1.15 |
| 2002/0089692 | A1 * | 7/2002 | Ferlitsch | 358/1.15 |
| 2004/0059995 | A1 * | 3/2004 | Takabayashi et al. | 715/500 |

FOREIGN PATENT DOCUMENTS

| | | | |
|---|---|---|---|
| JP | 2003-154735 | A | 5/2003 |
| JP | 2003-220742 | A | 8/2003 |
| JP | 2005-169623 | A | 6/2005 |
| JP | 2010-002972 | A | 1/2010 |

* cited by examiner

*Primary Examiner* — Gabriel Garcia
(74) *Attorney, Agent, or Firm* — Canon U.S.A., Inc. IP Division

(57) ABSTRACT

A printing control apparatus includes a storage unit configured to store information about a plurality of print jobs and a plurality of printing devices in a storage device, a detection unit configured to detect the shift of operating status of the plurality of printing devices, a determination unit configured to determine a print job which a printing device prints from the plurality of print jobs based on the information about the plurality of print jobs and the plurality of printing devices stored in the storage device when the shift of the printing device to a standby state is detected by the detection unit, and a print control unit configured to cause the first printing device to print the print job determined by the determination unit.

7 Claims, 14 Drawing Sheets

FIG.13A

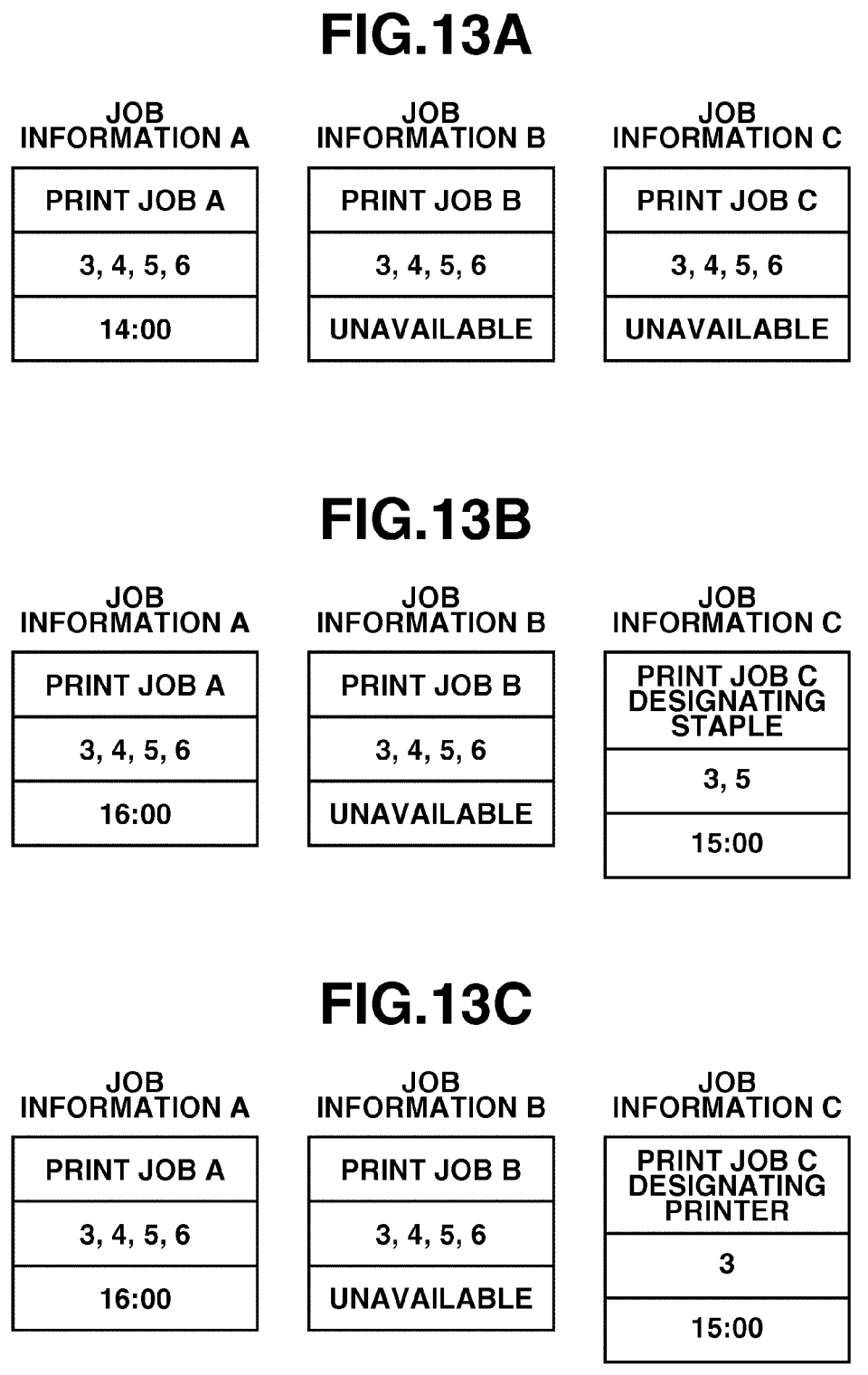

| JOB INFORMATION A | JOB INFORMATION B | JOB INFORMATION C |
|---|---|---|
| PRINT JOB A | PRINT JOB B | PRINT JOB C |
| 3, 4, 5, 6 | 3, 4, 5, 6 | 3, 4, 5, 6 |
| 14:00 | UNAVAILABLE | UNAVAILABLE |

FIG.13B

| JOB INFORMATION A | JOB INFORMATION B | JOB INFORMATION C |
|---|---|---|
| PRINT JOB A | PRINT JOB B | PRINT JOB C DESIGNATING STAPLE |
| 3, 4, 5, 6 | 3, 4, 5, 6 | 3, 5 |
| 16:00 | UNAVAILABLE | 15:00 |

FIG.13C

| JOB INFORMATION A | JOB INFORMATION B | JOB INFORMATION C |
|---|---|---|
| PRINT JOB A | PRINT JOB B | PRINT JOB C DESIGNATING PRINTER |
| 3, 4, 5, 6 | 3, 4, 5, 6 | 3 |
| 16:00 | UNAVAILABLE | 15:00 |

PRINTING CONTROL APPARATUS, PRINTING CONTROL METHOD, AND PROGRAM FOR REDUCING THE NUMBER OF TIMES OF SHIFTING A PRINTING APPARATUS TO THE STANDBY STATE TO REDUCE POWER CONSUMPTION

BACKGROUND OF THE INVENTION

1. Field of the Invention

The present invention relates to a printing control apparatus, a printing control method, and a program.

2. Description of the Related Art

An image output apparatus such as a digital copying machine, a laser beam printer (LBP), and a facsimile machine is connected to a network, and a document or image data is transmitted to the image output apparatus from a personal computer connected to the network and printed thereby. When the image output apparatus is not operated through an operation panel in a predetermined time period, the image output apparatus can be set to shift the image output apparatus from a standby state to a sleep state (power saving mode). The sleep state is referred to as a state in which the supply of electric power to a fixing device requiring a large electric power is interrupted to reduce power consumption of the entire apparatus.

In a conventional image output system, however, conditions of shift to the power saving mode depend on each apparatus, so that it has been difficult to generally control the power consumption of the image output apparatus connected to one unit of a network. For example, one printer connected to many personal computers operates by receiving a print command from one personal computer, finishes printing, and shifts again to the sleep state. Immediately after that, if the one printer receives a print command from another personal computer, the one printer wastes electric power due to a standby state between two print jobs.

If the print output is not urgently needed and the printer is in a sleep state when a print command is received, the print output is suspended by setting the time limit for printing out. Then the printer waits to shift to the standby state by other operations (such as, for example, print output in which time limit is not set or copy operation on the operation pane). After that, the suspended print output is resumed, thus the image output apparatus is controlled (refer to Japanese Patent Application Laid-Open No. 2003-220742, for example).

In the conventional technique a status management is performed on a image output apparatus basis, however, a total status management for printers in a case where a plurality of the image output apparatus is connected to the network is not taken into consideration. This causes a problem that the reduction of power consumption is insufficient, for example.

For example, if a plurality of image output apparatus with different characteristics and functions is connected to the network, a user selects one function and one image output apparatus if needed and performs printing, so that a process for saving electric power is executed only if the selected image output apparatus shifts to the standby state.

Therefore, if an image output apparatus satisfying a function selected by a user, although the user does not select the apparatus, shifts to the standby state, an output process is not executed, so that the reduction of power consumption as an entire network is insufficient.

SUMMARY OF THE INVENTION

The present invention is directed to the total reduction of the number of times of shift of a printing apparatus to the standby state to reduce power consumption.

According to an aspect of the present invention, a printing control apparatus includes a storage unit configured to store information about a plurality of print jobs and a plurality of printing devices in a storage device, a detection unit configured to detect the shift of operating status of the plurality of printing devices, a determination unit configured to determine a print job which a printing device prints from the plurality of print jobs based on the information about the plurality of print jobs and the plurality of printing devices stored in the storage device when the shift of the first printing device to a standby state is detected by the detection unit, and a print control unit configured to cause the first printing device to print the print job determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 13A, 13B, and 13C illustrate examples of job lists.

DESCRIPTION OF THE EMBODIMENTS

Various exemplary embodiments, features, and aspects of the invention will be described in detail below with reference to the drawings.

Figure 1:
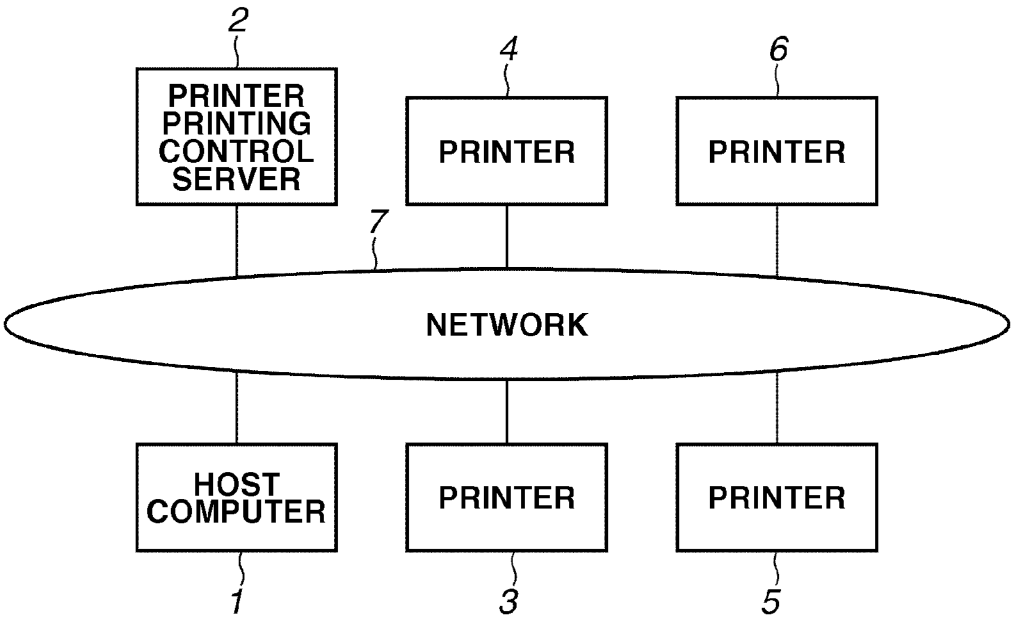
FIG. 1 illustrates an example of configuration of a print output system.

FIG. 1 illustrates an example of a configuration of a print output system according to the present exemplary embodiment. The print output system includes a host computer 1, a printer printing control server 2, and printers 3 to 6. The apparatus of the print output system are connected to one another via a network 7.

The host computer 1 is an example of an information processing apparatus and a computer used by a user. The host computer 1 is capable of creating a document and transferring the electronic mail to and from other apparatus connected to the network (LAN and the like). The host computer 1 receives a request for printing from the user and creates print data according to the contents of the printing request. The host computer 1 passes the created print data to any one of the printers 3 to 6 to cause the printer to execute print (print processing). For example, the host computer 1 functions as a printing control apparatus for controlling the print processing of print data performed by the printer.

The printer printing control server 2 receives printer information (i.e., one example of apparatus information) from the printers 3 to 6. The printer information is described later with reference to FIGS. 5A and 5B.

The printer printing control server 2 stores the received printer information in a storage area structured in the printer printing control server 2 or other apparatus. For example, the printer printing control server 2 stores the printer information in a printer information DB via a printer information storage unit 204 described later with reference to FIG. 3.

The printers 3 to 6 are a plurality of printing apparatus with printing functions different from one another. Each of the printers 3 to 6 receives print data from the host computer 1 and executes the print processing according to the received print data.

For example, power consumption per hour of the printers 3, 4, 5, and 6 are taken as P1, P2, P3, and P4. In the present exemplary embodiment, it is assumed that P1, P2, P3, and P4 have a relation of P1>P2>P3>P4. The printers 3 and 5 have a staple function as a print capability.

The printers 3 to 6 have the standby mode in which electric power is consumed by electrical components and the sleep mode in which electric power is less consumed.

Figure 2:
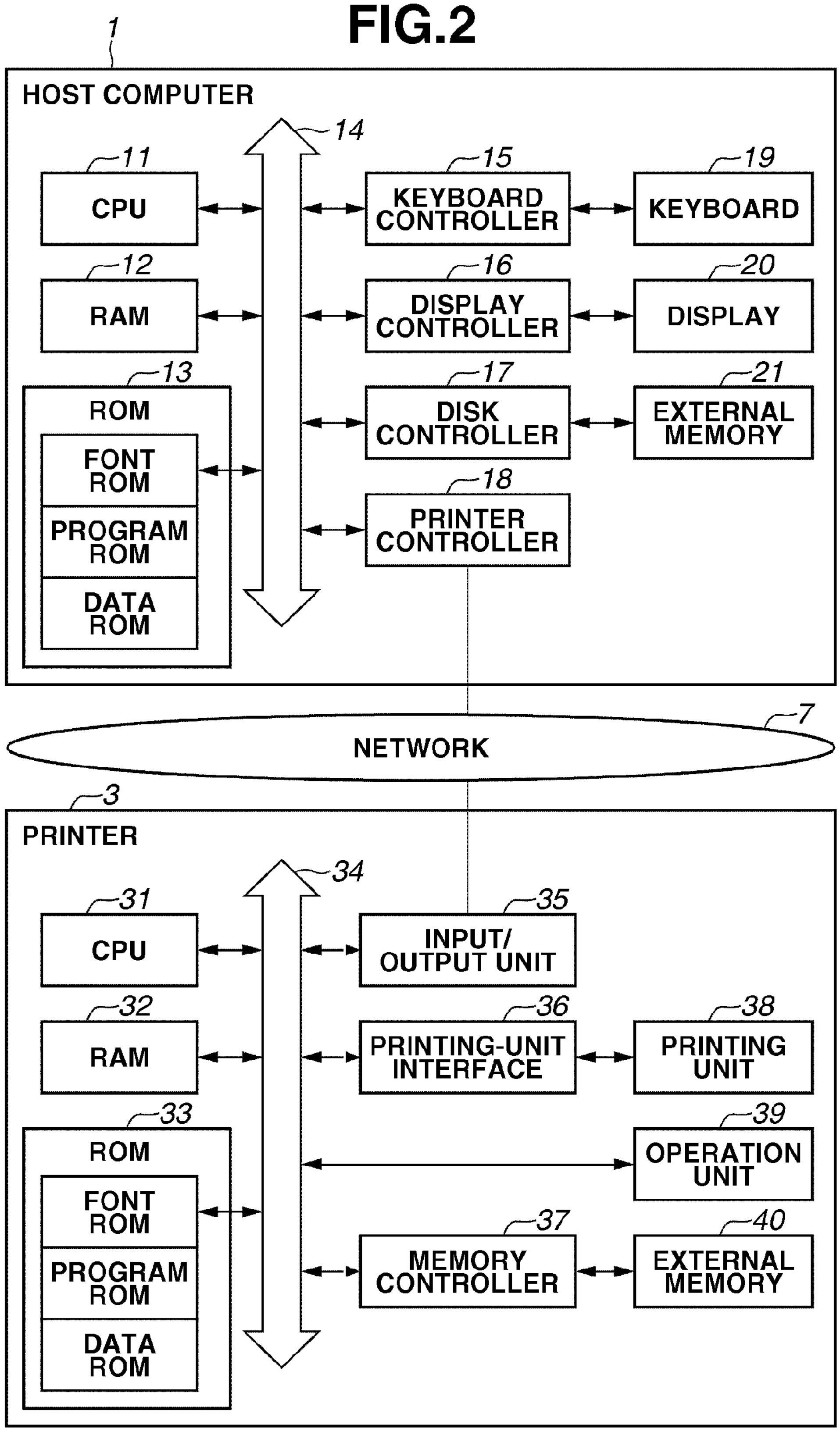
FIG. 2 illustrates an example of hardware configuration of a host computer and a printer.

FIG. 2 illustrates an example of a hardware configuration of the host computer 1 of the print output system and an example of a hardware configuration of the printer 3 thereof. The printer printing control server 2 is similar in hardware configuration to the host computer 1 and the printers 4 to 6 are similar in hardware configuration to the printer 3.

The host computer 1 includes a central processing unit (CPU) 11, a random access memory (RAM) 12, and a read only memory (ROM) 13. The host computer 1 further includes a system bus 14, a keyboard controller 15, a display controller 16, a disk controller 17, a printer controller 18, a keyboard 19, a display 20, and an external memory 21.

The CPU 11 controls the execution of a document processing and a print processing based on a document processing according to a document processing program stored in a program ROM included in the ROM 13 or in the external memory 21. The document processing represents a process related to a document including a figure, an image, a character, and a table (including a spreadsheet), for example. The CPU 11 controls the devices connected to the system bus 14.

The RAM 12 functions as a main memory and a work area of the CPU 11. The ROM 13 includes a program ROM, a font ROM, and a data ROM. The program ROM in the ROM 13 or the external memory 21 stores an operating system (OS) program which is a control program executed by the CPU 11. The font ROM in the ROM 13 or the external memory 21 stores font data used for the document processing. The data ROM in the ROM 13 or the external memory 21 stores various data used for the document processing. The CPU 11, the RAM 12, the ROM 13, the keyboard controller 15, the display controller 16, the disk controller 17, and the printer controller 18 are connected to the system bus 14.

The keyboard controller 15 controls a key input from the keyboard 19 (or, a pointing device not illustrated). The display controller 16 controls the display of the display 20. The disk controller 17 controls access to the external memory 21. A hard disk and a flexible disk is used as the external memory 21 for storing a boot program, various application programs, font data, a user file, an editing file, and a printer control command generating program, for example.

The printer controller 18 is connected to the printer 3 via the network 7 and executes the processing for controlling communication with the printer 3. The CPU 11 opens previously registered various windows based on a command indicated by a mouse cursor (not illustrated) on the display 20 and executes various data processing. When the user executes printing, the user opens the window related to the setting of printing to enable the setting of a printer and the setting of the print processing such as the selection of print modes.

In the present exemplary embodiment, the functions of the host computer 1 and the processing related to a flow chart described later are realized by the CPU 11 performing a process in accordance with the procedure of a program stored in the external memory 21. The functions of the printer printing control server 2 and the processing related to a flow chart described later are realized by the CPU of the printer printing control server 2 performing a process in accordance with the procedure of a program stored in the external memory.

The printer 3 includes a CPU 31, a RAM 32, a ROM 33, a system bus 34, an input/output unit 35, a printing-unit interface 36, a memory controller 37, a printing unit 38, an operation unit 39, and an external memory 40.

The CPU 31 controls the entire printer 3. The CPU 31 inputs an image signal as print output information to the printing unit 38 (i.e., printer engine) via the printing-unit interface 36 based on the control program stored in the ROM 33 or the external memory 40. The RAM 32 functions as a main memory and a work area of the CPU 31. A memory capacity can be extended by an optional RAM connected to an expansion port not illustrated. The RAM 32 is used for an output information rasterizing area, an environmental data storing area, and a non volatile random access memory (NVRAM). The ROM 33 includes a font ROM, a program ROM, and a data ROM. The font ROM of the ROM 33 stores font data used for generating print output information. The program ROM of the ROM 33 stores a control program executed by the CPU 31. For a printer without the external memory 40 such as a hard disk, for example, the data ROM of the ROM 33 stores various pieces of information used for the operation process of the printer 3.

The CPU 31, the RAM 32, the ROM 33, the input/output unit 35, the printing-unit interface 36, the memory controller 37, and the operation unit 39 are connected to the system bus 34. The input/output unit 35 is a network card and the like. The CPU 31 transfers data between the printer 3 and the host computer 1 via the input/output unit 35 and the network 7. Thereby, information in the printer 3, for example, is transmitted (notified) to the host computer 1. The printing-unit interface 36 is an interface between the CPU 31 and the printing unit 38.

The memory controller 37 controls access to the external memory 40. The printing unit 38 forms an image based on the image signal input from the CPU 31 via the printing-unit interface 36 and causes a fixing device to output the image to a sheet (for example, a permanent image). The operation unit 39 performs processing according to the operation of the user. The operation unit 39 is, for example, an operation panel including a switch operated by the user and a light emitting diode (LED) display. In the present exemplary embodiment, the printer 3 may include an NVRAM not illustrated, which stores setting information which is related to the print mode of the printer 3 and input from the operation unit 39. The external memory 40 is a hard disk or an IC card, for example. The external memory 40 is connected optionally and stores font data, emulation program, and form data.

Figure 3:
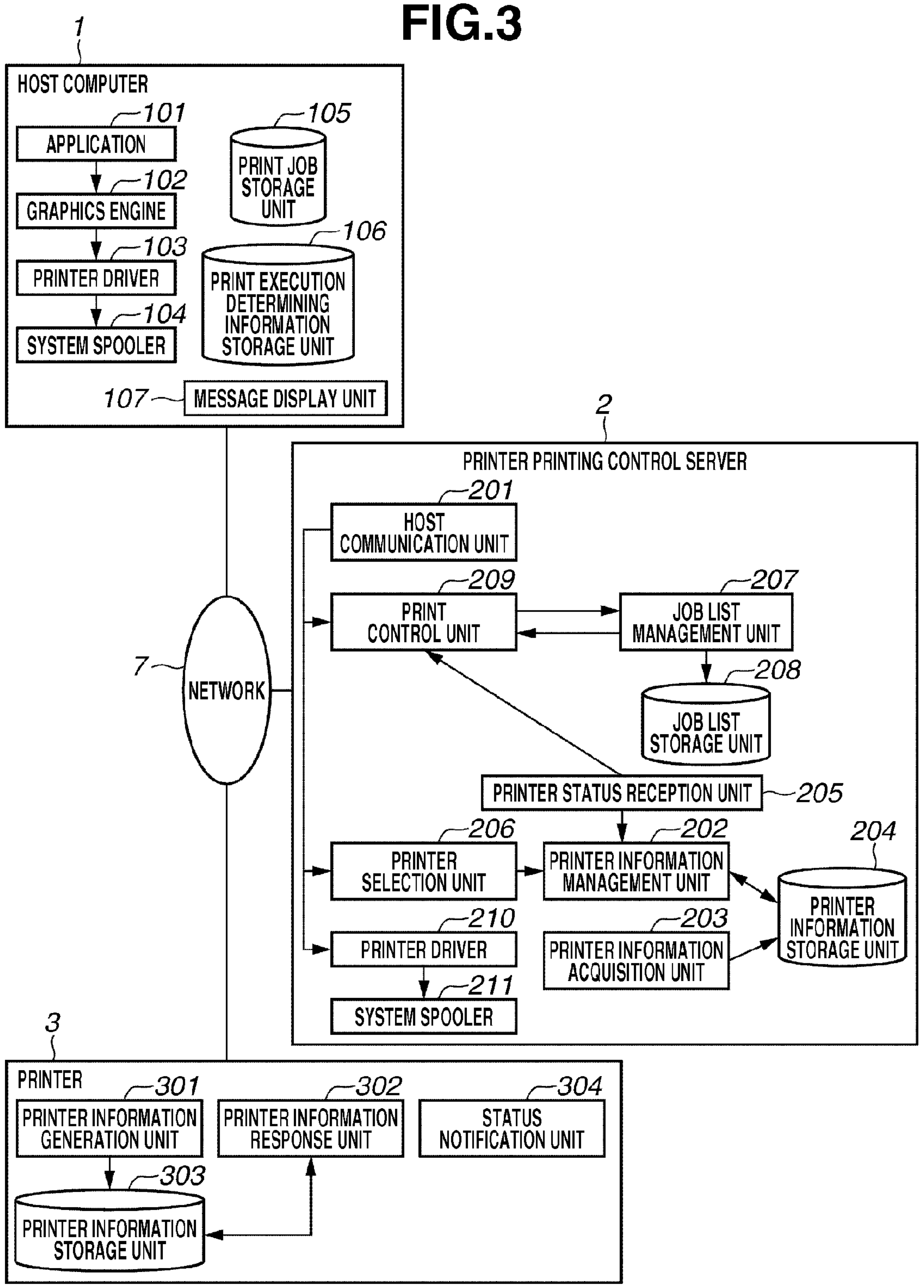
FIG. 3 illustrates an example of configuration of the print output system.

FIG. 3 illustrates an example of configuration of the print output system. FIG. 3 illustrates the printer 3 as an example of a printer connected to the host computer 1 via the network 7. In the present exemplary embodiment, however, as described with reference to FIG. 1, a plurality of printers (for example, the printers 3 to 6) are actually connected to the host computer 1.

The host computer 1 includes an application 101, a graphics engine 102, a printer driver 103, a system spooler 104, a print job storage unit 105, a print execution determining information storage unit 106, and a message display unit 107. A program related to the application 101 exists as a file stored in the external memory 21 illustrated in FIG. 2. When the program is executed, the program is loaded to the RAM 12 by an OS or a module using its module and executed. The program related to the application 101 and the printer driver 103 can be added to a CD-ROM and a DVD-ROM not illustrated, or the external memory 21 (a hard disk and the like) via the network.

The application 101 is a software executing the print processing. The program related to the application 101 is loaded to the RAM 12 and executed. When the program related to the application 101 is executed to start the print processing, the graphics engine 102 executes a drawing process and generates print data. The program related to the graphics engine 102 is loaded to the RAM 12 and executed as is the case with the program related to the application 101. The printer driver 103 converts the output by the application 101 into a printer control command of the printer which executes printing (print output). The printer control command is a command for instructing the printing of the print data generated by the graphics engine 102.

The printer driver 103 is prepared for each printer connected to the host computer 1 via the network 7. The program related to the printer driver 103 is loaded from the external memory 21 to the RAM 12 and executed to operate the printer driver 103. The system spooler 104 transmits (outputs) the printer control command converted by the printer driver 103 to the printer which executes printing (print output) via the network 7. The printer executes printing after receiving the printer control command. A program related to the system spooler 104 is also loaded to the RAM 12 and executed.

The print job storage unit 105 stores a print job including information about the print data generated by the graphics engine 102. The print execution determining information storage unit 106 stores a print execution determining information including information about print execution condition to which the printer driver 103 refers in printing. The print execution determining information can be previously stored.

For example, the application 101 stores the previously stored print execution determining information as a part of print setting included in the print data generated by the graphics engine 102 via the print execution determining information storage unit 106. The printer driver 103 refers to the print execution determining information as a part of the print data. The message display unit 107 receives request for displaying massage from a host communication unit 201 and notifies the user of the message according to the contents of the request.

The printer printing control server 2 includes a host communication unit 201, a printer information management unit 202, a printer information acquisition unit 203, a printer information storage unit 204, a printer status reception unit 205, and a printer selection unit 206. The printer printing control server 2 further includes a job list management unit 207, a job list storage unit 208, a print control unit 209, a printer driver 210, and a system spooler 211.

The host communication unit 201 communicates with the host computer 1 and receives a print job from the host computer 1. The printer information management unit 202 manages printer information accumulated in a printer information DB via the printer information storage unit 204. The printer information acquisition unit 203 acquires printer information from the printer connected to the printer printing control server 2 via the network 7 and accumulates acquired printer information in the printer information DB via the printer information storage unit 204. The printer information storage unit 204 stores (i.e., accumulates) the printer information in the printer information DB.

The printer status reception unit 205 receives notification (status change notification) that the status is changed, from the printer connected to the printer printing control server 2 via the network 7. The printer selection unit 206 selects an operable printer. For example, the printer selection unit 206 is requested to provide a list of printers capable of printing print jobs via the print control unit 209. The printer selection unit 206 analyzes print setting included in print jobs and extracts printer information about printers capable of printing print jobs from the printer information DB via the printer information management unit 202 and the printer information storage unit 204. The printer selection unit 206 passes the extracted printer information to the print control unit 209.

The job list management unit 207 stores and manages the print job received by the host communication unit 201 into the job list via the job list storage unit 208. The job list is a list of information (job information described later) about the print job stored in the printer printing control server 2.

The print control unit 209 controls print based on the print job received by the host communication unit 201. The printer driver 210 converts output from the print control unit 209 to a printer control command of the printer which executes print. The printer driver 210 is prepared for each printer connected to the host computer 1 via the network 7. The system spooler 211 outputs the printer control command converted by the printer driver 210 to the printer which executes print via the network 7. The program related to the printer driver 210 and the system spooler 211 is loaded to a RAM not illustrated from an external memory not illustrated of the printer printing control server 2 and executed.

The printer 3 includes a printer information generation unit 301, a printer information response unit 302, a printer information storage unit 303, and a status notification unit 304.

The printer information generation unit 301 generates printer information and accumulates the generated printer information in the DB via the printer information storage unit 303. The printer information response unit 302 is requested to provide the printer information from the printer information acquisition unit 203 of the printer printing control server 2 and transmits the printer information stored in the DB to the printer information acquisition unit 203. The status notification unit 304 notifies the printer printing control server 2 via the network 7 when the status of the printer 3 is shifted to the sleep mode or the standby mode. The printing control method according to the present exemplary embodiment is realized by the operation of the print output system or the host computer 1 of the print output system.

Figure 4A:
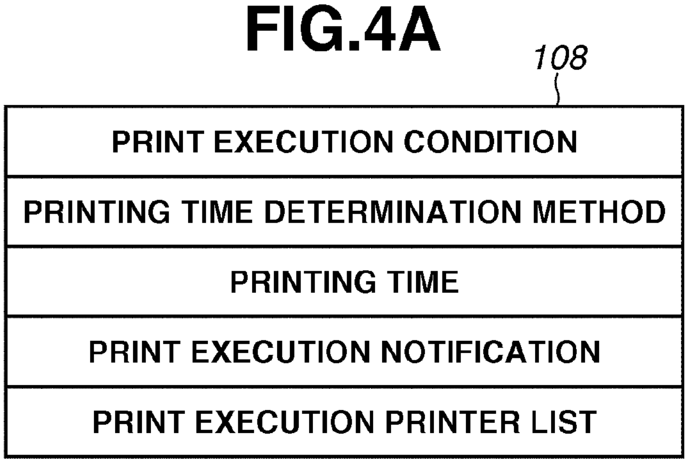
FIGS. 4A and 4B illustrate examples of a print execution determining information and a setting screen of the print execution determining information respectively.
Figure 4B:
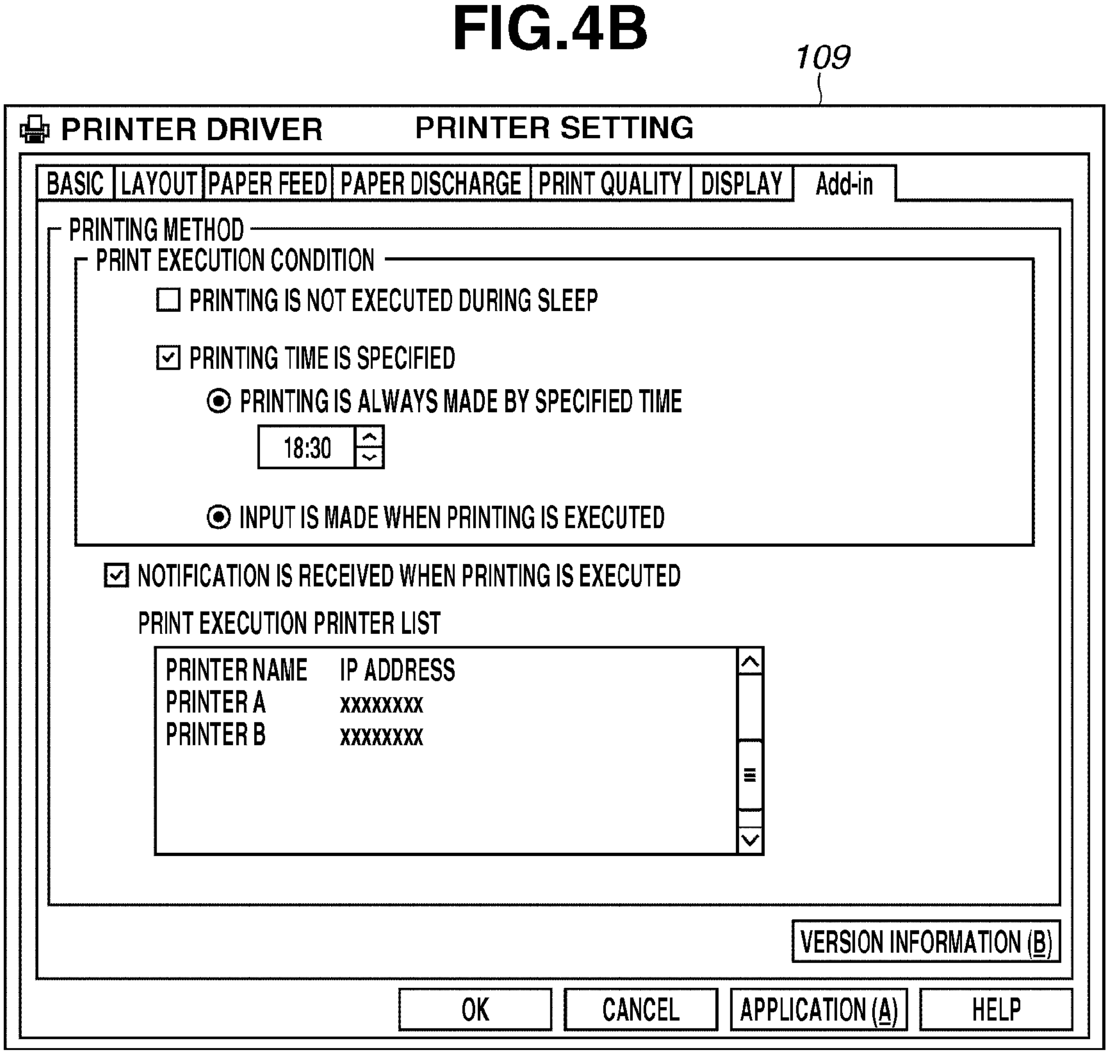

FIGS. 4A and 4B illustrate examples of a print execution determining information 108 and a setting screen 109 of the print execution determining information respectively.

FIG. 4A illustrates an example of the print execution determining information 108. The print execution determining information 108 includes a print execution condition, a printing time determination method, printing time, print execution notification, and a print execution printer list.

The print execution condition denotes information about a condition for determining the timing at which printing is executed. For example, the print execution condition denotes information about a condition in which a target printer does not print in sleep mode and about a condition for executing printing in which the printing time is specified to cause the target printer to print in standby mode wherever possible.

The printing time determination method denotes information about a method for specifying time in a case where time is specified as print execution condition. For example, the printing time determination method is a method for determining the printing time in which either time is set every time printing is executed or printing is performed always at a particular time in a case where time is specified as print execution condition. The printing time denotes information about a time limit for executing print. The print execution notification denotes information indicating whether notification is received when printing is executed. The print execution printer list is a list of printers allowed to print at the time of executing printing.

FIG. 4B illustrates an example of the setting screen 109 of the print execution determining information. The setting screen 109 is displayed on the display 20 by the printer driver 103 which is an example of a reception unit. The user can perform a setting operation on the screen illustrated in FIG. 4B to set the print execution determining information. In the example illustrated in FIG. 4B, the printer driver 103 sets the print execution condition, the printing time determination method, the printing time, the print execution notification, and the print execution printer list according to the user's setting operation.

Figure 5A:
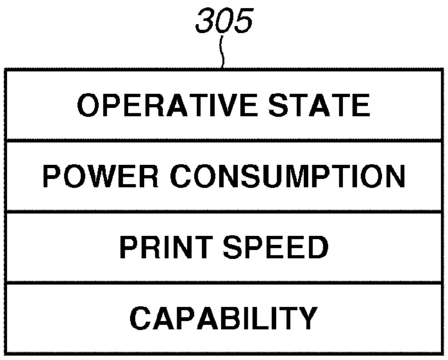
FIGS. 5A and 5B illustrate examples of a printer information and the data structure of the printer information data base (DB) respectively.
Figure 5B:
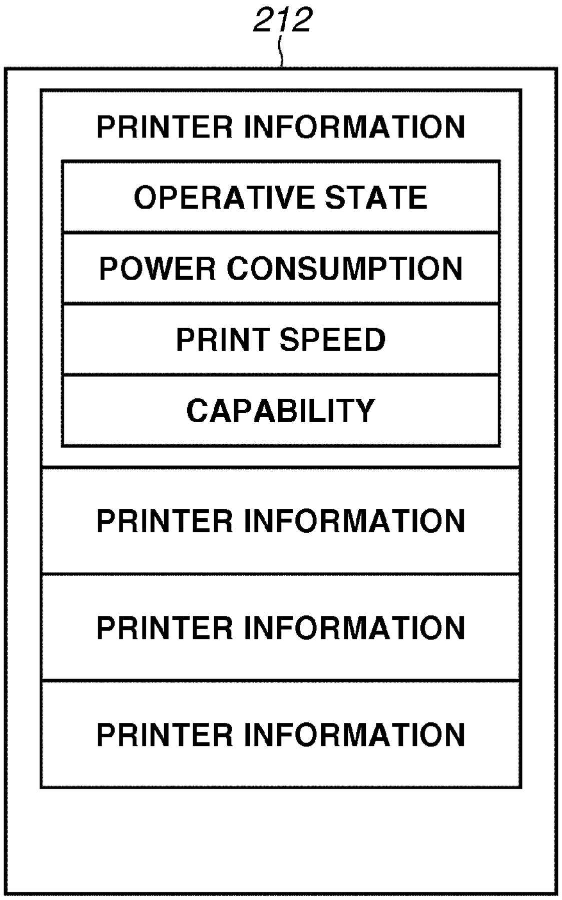

FIGS. 5A and 5B illustrate examples of a printer information 305 in the printer and the data structure of the printer information DB 212 in the printer printing control server 2 respectively.

FIG. 5A illustrates an example of the printer information 305. The printer information 305 includes information about the operating status, the power consumption, the print speed, and the capability of the printer. The operating status indicates the current operating status of the printer. The power consumption indicates the average of power consumption of the printer while it is in operation. The print speed indicates the average print speed of the printer. The capability indicates the capability of the printer. The capability includes a color printing function and a staple function, for example.

FIG. 5B illustrates an example of the data structure of the printer information DB 212 in the printer printing control server 2. The printer information DB 212 accumulates printer information for each printer existing on the network 7. The printer information includes information about the operating status, the power consumption, the print speed, and the capability of the printer, for example. In other words, the power consumption and the print speed of the printer are print characteristic information of the printer. The printer information acquisition unit 203 of the printer printing control server 2 acquires the printer information illustrated in FIG. 5A from each printer. The printer information acquisition unit 203 accumulates the acquired printer information with the data structure illustrated in FIG. 5B in the printer information DB 212 via the printer information storage unit 204.

Figure 6:
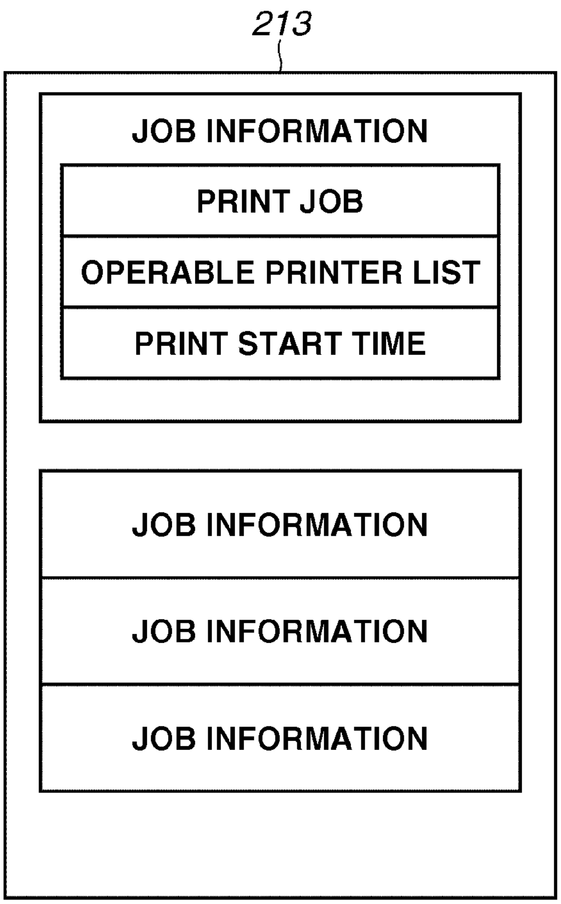
FIG. 6 illustrates an example of data structure of DB related to a job list storage unit.

FIG. 6 illustrates an example of data structure of a job list in the printer printing control server 2 (job list 213). The job list 213 accumulates job information for each print job. The job information includes information about a print job, a printable printer list, and print start time, for example.

The printer selection unit 206 of the printer printing control server 2 calculates an operable printer from each print job. The print control unit 209 calculates the print start time of the print job from print data (the number of pages and color setting) and the printer information of a target printer (print speed). The job list storage unit 208 accumulates the print job and the calculated operable printer list and print start time (with the data structure illustrated in FIG. 6) as job information in the job list 213.

Figure 7:
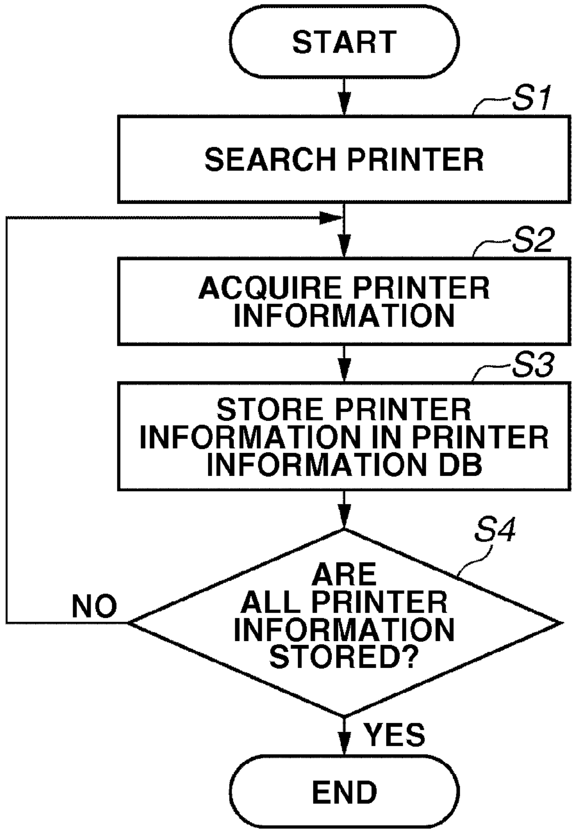
FIG. 7 illustrates an example of a flow chart related to a storage process.

FIG. 7 illustrates an example of a flow chart related to an accumulation process in which the printer printing control server 2 accumulates printer information.

In step S1, the printer information acquisition unit 203 searches a printer on the network 7. In step S2, the printer information acquisition unit 203 acquires printer information from the searched printer.

In step S3, the printer information acquisition unit 203 accumulates the printer information with the data structure illustrated in FIG. 5B in the printer information DB via the printer information storage unit 204. In step S4, the printer information acquisition unit 203 determines whether the accumulation of the printer information about all the printers searched in step S1 in the printer information DB is completed. If the printer information acquisition unit 203 determines that there are printers which have not yet completed the storage of the printer information (NO in step S4), the processing returns to step S2. On the other hand, if the printer information acquisition unit 203 determines that the storage of the printer information about all the printers searched in step S1 is completed (YES in step S4), the storage process is ended.

Figure 8:
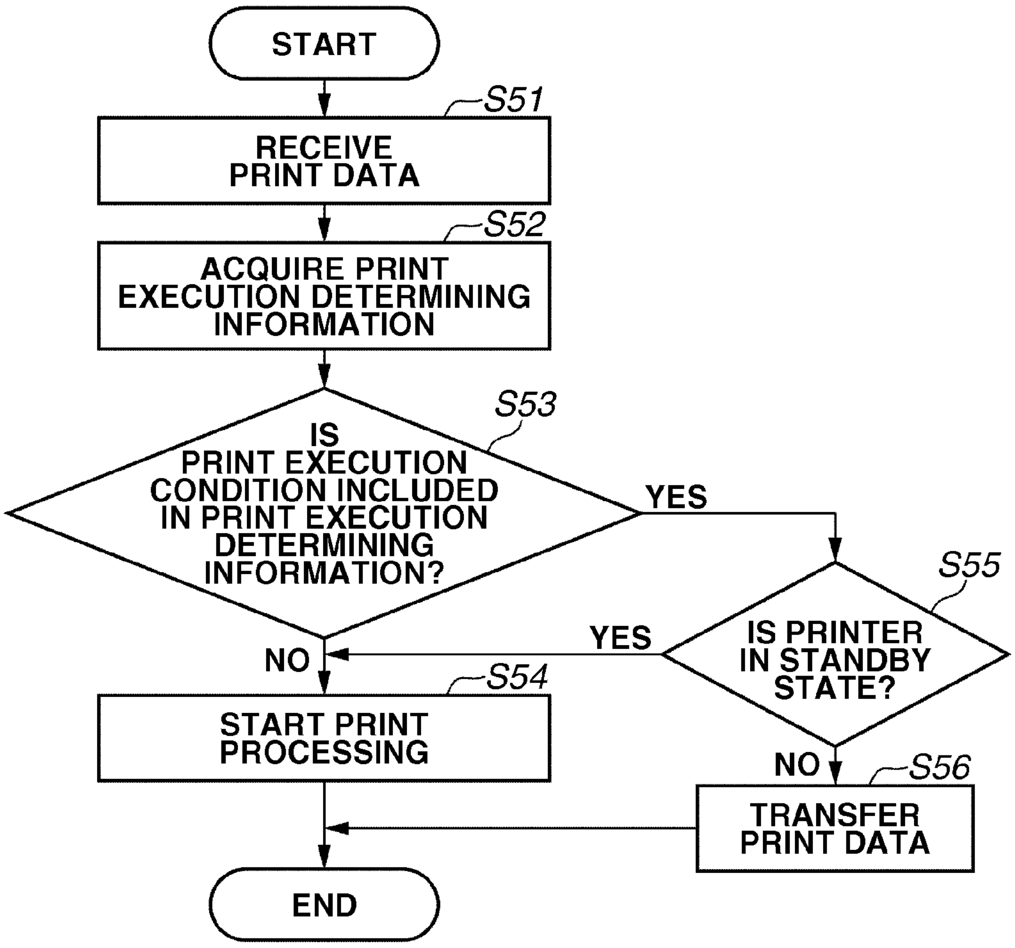
FIG. 8 illustrates an example of a flow chart related to a determination process.

FIG. 8 illustrates an example of a flow chart related to a determination process in which the host computer 1 determines whether printing is immediately performed by a printer designated to print. As described above, the application 101 of the host computer 1 starts executing the print processing of a document to cause the graphics engine 102 to generate print data.

In step S51, the printer driver 103 receives the generated print data from the graphics engine 102. In step S52, the printer driver 103 acquires a print execution determining information from the print data. In step S53, the printer driver 103 determines whether a print execution condition is included in the print execution determining information. If the printer driver 103 determines that the print execution condition is included therein (YES in step S53), the processing proceeds to step S55. If the printer driver 103 determines that the print execution condition is not included therein (NO in step S53), the processing proceeds to step S54.

In step S54, the printer driver 103 starts print processing using the target printer and ends the determination process.

In step S55, the printer driver 103 determines whether the target printer is in the standby state. If the printer driver 103 determines that the target printer is in the standby state (YES in step S55), the processing proceeds to step S54. If the printer driver 103 determines that the target printer is not in the standby state (NO in step S55), the processing proceeds to step S56.

In step S56, the printer driver 103 transfers print data (print job) to the host communication unit 201 and ends the determination process.

Figure 9:
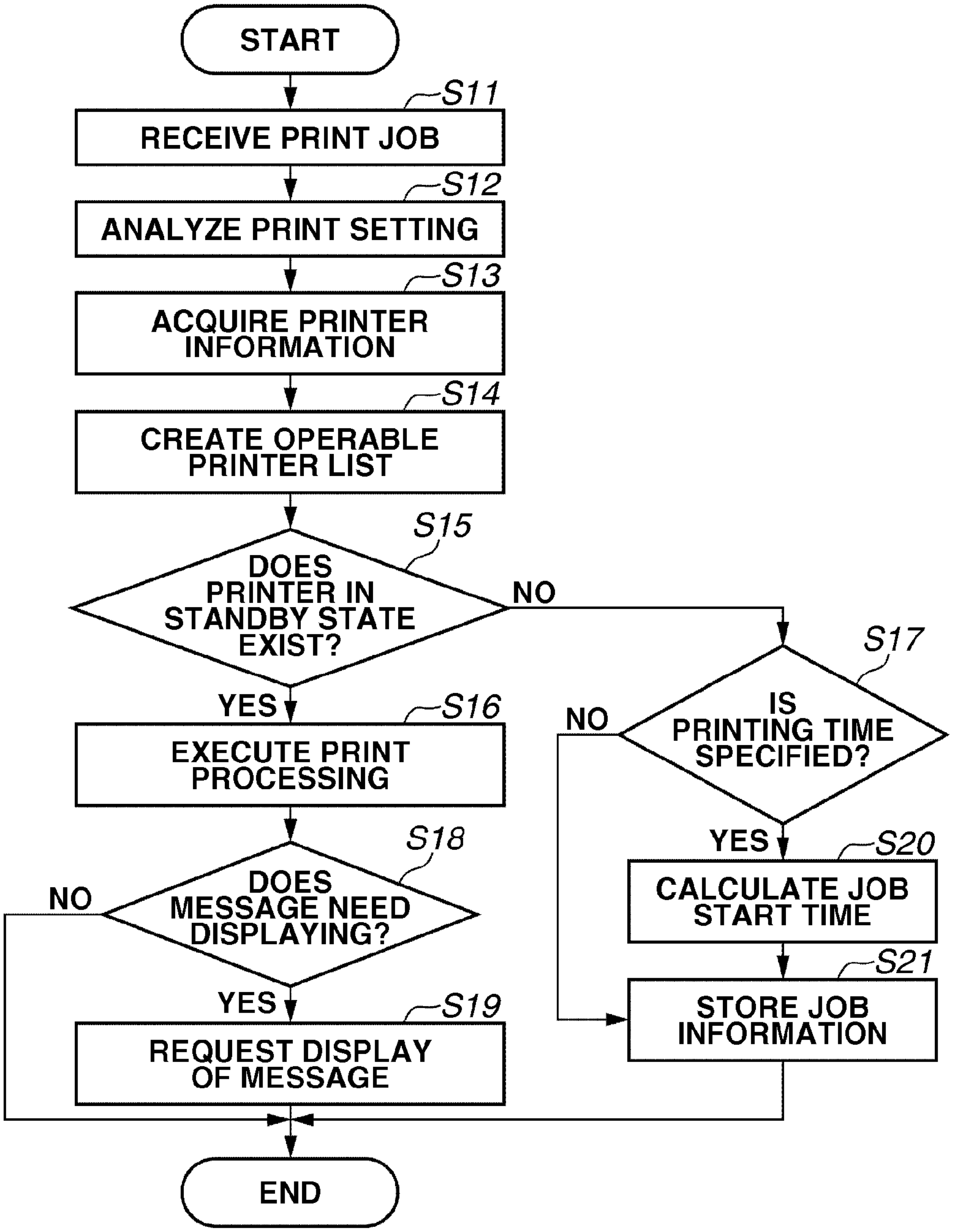
FIG. 9 illustrates an example of a flow chart related to a transfer print control process.

FIG. 9 illustrates an example of a flow chart related to a print control process during transfer for the printer printing control server 2 controlling printing based on a print job when the print job is transferred by the printer driver 103 of the host computer 1 to the printer printing control server 2.

In step S11, the host communication unit 201 receives a print job. In step S12, the printer selection unit 206 analyzes print setting included in the print job received by the host communication unit 201. The print setting includes the print execution determining information. In step S13, the printer selection unit 206 acquires printer information from the printer information DB via the printer information management unit 202 and the printer information storage unit 204. In step S14, the printer selection unit 206 generates a list of printers capable of printing the print job (operable printer list). For example, an operable printer is selected (calculated) with reference to the print execution printer list of the print execution determining information included in the print job, the print setting analyzed in step S12, and the capability of the printer information. If stapling is set as print setting of the print job, the printers 3 and 5 with a staple function are selected as candidates of operable printers and the printers appearing on the print execution printer list illustrated in FIG. 4B are operable printers.

In step S15, the printer selection unit 206 determines whether a printer being in the standby state exists in the generated printable printer list. If the printer selection unit 206 determines that a printer in the standby state exists therein (YES in step S15), the printer selection unit 206 refers to the printer information of the printer in the standby state and notifies the print control unit 209 of information related to a printer of which power consumption is the smallest. The processing proceeds to step S16. If the printer selection unit 206 determines that a printer in the standby state does not exist therein (NO in step S15), the processing proceeds to step S17.

In step S16, the print control unit 209 starts print processing of the printer of which the printer selection unit 206 notifies in step S15 and performs output to the printer driver 210 corresponding to the target printer for output. The printer driver 210 converts the output of the print control unit 209 into a control command of the printer which executes printing. The system spooler 211 outputs the printer control command converted by the printer driver 210 to the printer which executes printing via the network 7.

In step S18, the print control unit 209 refers to the print execution notification of the print execution determining information included in the print job to determine whether to perform the notification of a message at the time of executing printing. If the print control unit 209 determines to perform the notification of a message (YES in step S18), the processing proceeds to step S19. If the print control unit 209 determines not to perform the notification of a message (NO in step S18), the print control unit 209 ends the transfer print control process.

Figure 10:
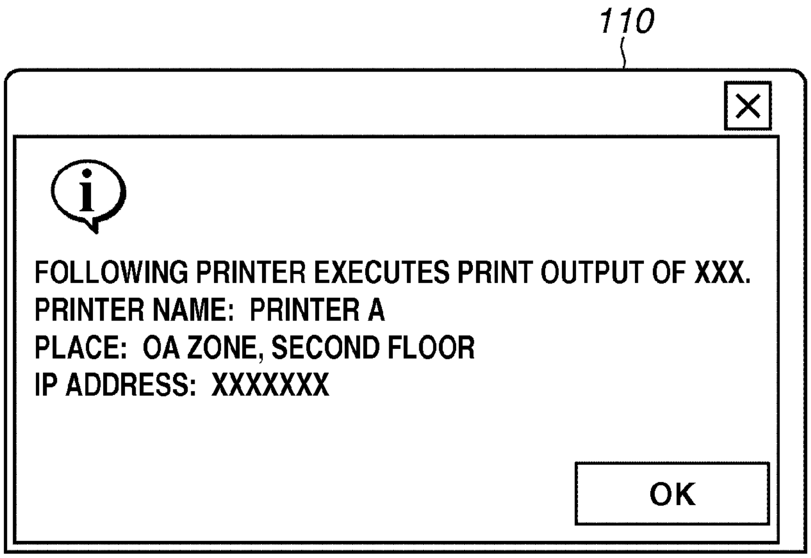
FIG. 10 illustrates an example of displaying a confirmation message.

In step S19, the host communication unit 201 requests the message display unit 107 of the host computer 1 to display the message. The message display unit 107 requested to display the message displays the message (refer to FIG. 10, for example) and ends the transfer print control process. FIG. 10 illustrates an example of displaying a confirmation message (a confirmation screen 110).

In step S17, the print control unit 209 refers to the printing time of the print execution determining information included in the print job to determine whether the designation of the printing time exists. If the print control unit 209 determines that the designation of the printing time exists (YES in step S17), the print control unit 209 performs the processing in step S20. If the print control unit 209 determines that the designation of the printing time does not exist (NO in step S17), the print control unit 209 performs the processing in step S21.

In step S20, the print control unit 209 calculates the print start time of the print job. The print start time of the print job is calculated from print data (the number of pages, color setting and the like) and the printer information of a target printer (print speed and the like).

In step S21, the print control unit 209 stores the job information in the job list with the data structure illustrated in FIG. 6 via the job list management unit 207 and the job list storage unit 208 and ends the transfer print control process.

Figure 11:
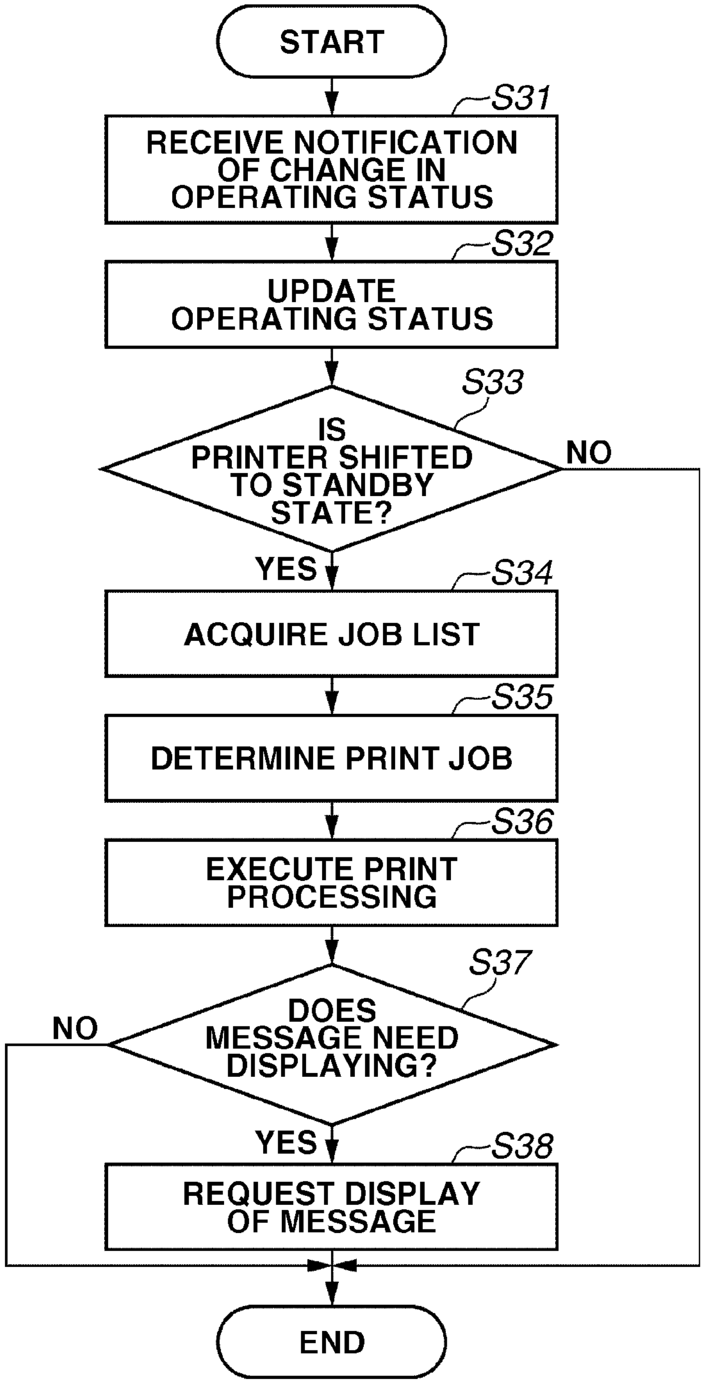
FIG. 11 illustrates an example of a flow chart related to a state-change print control process.

FIG. 11 illustrates an example of a flow chart related to a print control process during state-change in which the printer printing control server 2 controls printing based on the job list when the operating status of any of printers existing on the network 7 is changed.

In step S31, the status notification unit 304 notifies the printer status reception unit 205 that the operating status of a printer is changed. In other words, the printer printing control server 2 detects the shift of operating status of a plurality of printers. In step S32, the printer information management unit 202 updates the operating status of printers in the printer information DB via the printer information storage unit 204. In step S33, the print control unit 209 determines whether a printer is shifted to the standby state. If the print control unit 209 determines that a printer is shifted to the standby state (YES in step S33), the processing proceeds to step S34. If the print control unit 209 determines that a printer is not shifted to the standby state (NO step S33), the print control unit 209 ends the print control process during state-change.

In step S34, the job list management unit 207 acquires the job list via the job list storage unit 208 and passes it to the print control unit 209. In step S35, the print control unit 209 determines one or a plurality of print jobs in which the printer shifted to the standby state executes printing. A detailed process in step S35 is described later with reference to FIG. 12. In step S36, the print control unit 209 outputs the print job determined in step S35 to the printer driver 210 corresponding to the target printer for output and deletes the job information including the output print job from the job list. The job list management unit 207 receives the updated job list from the print control unit 209 and updates the job list via the job list storage unit 208. The printer driver 210 converts the output of the print control unit 209 into the printer control command of the printer which executes printing. The system spooler 211 outputs the printer control command converted by the printer driver 210 to the printer which executes printing via the network 7.

In step S37, the print control unit 209 refers to the print execution notification of the print execution determining information included in the print job to determine whether to perform the notification of a message at the time of executing printing. If the print control unit 209 determines to perform the notification of a message (YES in step S37), the processing proceeds to step S38. If the print control unit 209 determines not to perform the notification of a message (NO in step S37), the print control unit 209 ends the state-change print control process.

In step S38, the host communication unit 201 requests the message display unit 107 of the host computer 1 to display the message and ends the print control process during state-change. The message display unit 107 requested to display the message displays the message (refer to FIG. 10, for example).

Figure 12:
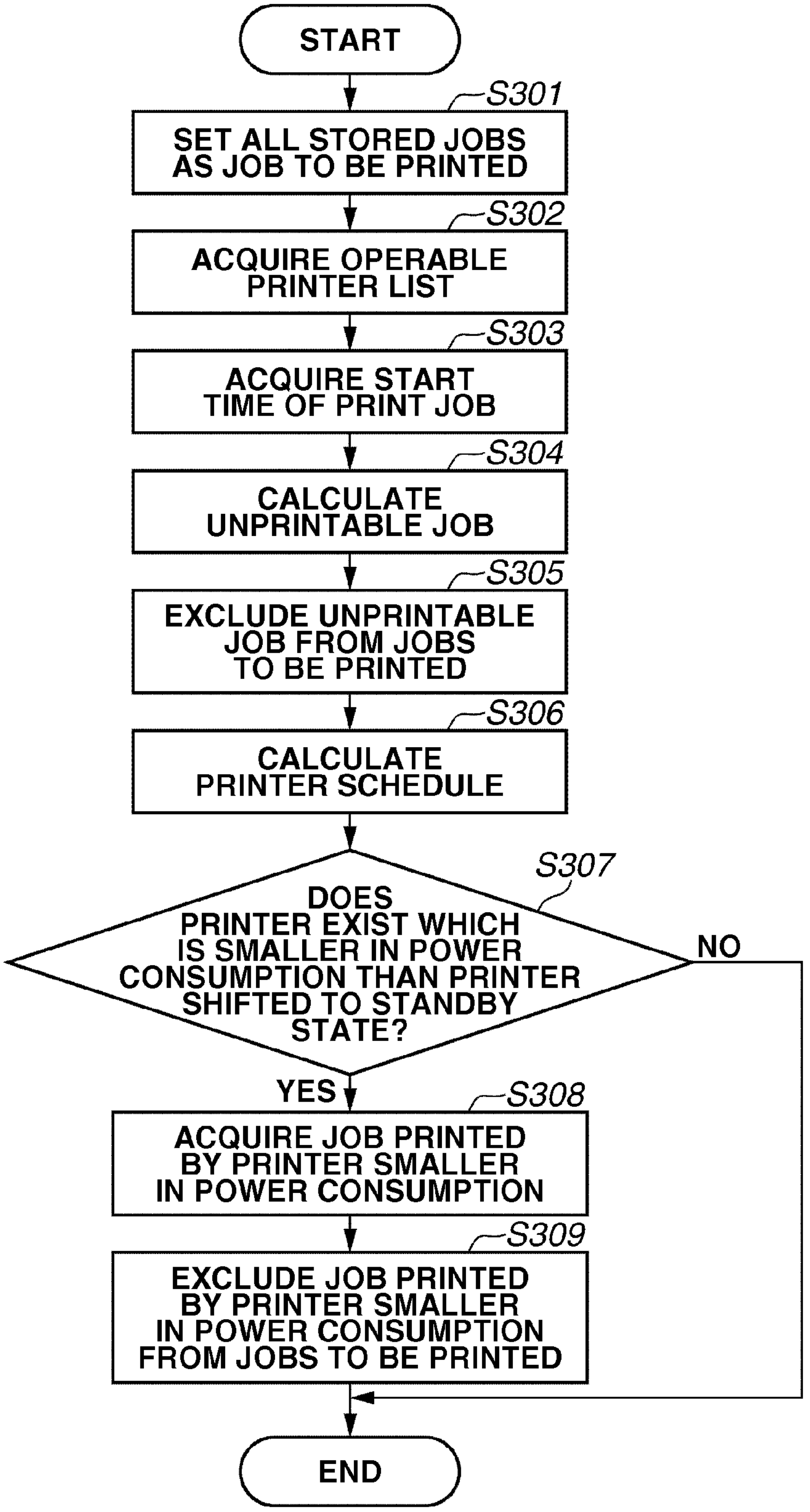
FIG. 12 illustrates an example of a flow chart related to a selection process.

FIG. 12 illustrates an example of a flow chart related to a selection process for selecting (determining) a print job in which the print processing is executed by the printer shifted to the standby state in step S35 in FIG. 11.

In step S301, the print control unit 209 sets all the print jobs stored in the job list acquired in step S34 as print targets. In step S302, the print control unit 209 refers to the job information of the job list to acquire the operable printer list of each print job. In step S303, the print control unit 209 refers to the job information of the job list to acquire the print start time of each print job. In step S304, the print control unit 209 refers to the operable printer list acquired in step S302 to select (calculate) a job which a printer shifted to the standby state cannot print. For example, if a staple function is set in a print job and the printer 4 without the staple function is shifted to the standby state, the print job is the one which cannot be printed. In step S305, the print control unit 209 excludes the print job selected in step S304 which cannot be printed, from the target print job.

In step S306, the print control unit 209 refers to the job information to calculate the starting time of the printer and the target print job in which printing is performed by the printer. For example, the print control unit 209 refers to the operable printer list and the print start time of each print job to calculate a starting schedule. More specifically, the print control unit 209 calculates a starting schedule for starting a printer so that the number of printers to be started is minimized and the power consumption is minimized in the minimum number of printers by a continuous print processing of a plurality of print jobs.

The print control unit 209 refers to the starting schedule of the printer calculated in step S306 and the printer information DB. In step S307, the print control unit 209 compares the power consumption between the printer requiring starting because it is the target printer for the print job that cannot be printed as determined in step S304, and the printer shifted to the standby state. As a result of comparison, if the print control unit 209 determines that the printer requiring starting is smaller in power consumption than the printer shifted to the standby state (the printer with smaller power consumption is started) (YES in step S307), the processing proceeds to step S308. On the other hand, as a result of the comparison, if the print control unit 209 determines that the printer requiring starting is larger in power consumption than the printer shifted to the standby state (NO in step S307), the selection process is ended.

In step S308, the print control unit 209 acquires the print job printed by the printer with smaller power consumption, which is determined to be started in step S307. In step S309, the print control unit 209 excludes the print job acquired in step S308 and printed by the printer with smaller power consumption from target printing jobs and ends the selection process.

The flow chart illustrated in FIG. 12 is described using FIGS. 13A, 13B, and 13C when the printer 4 is shifted to the standby state at a current time of 13:00 as examples.

In FIG. 13A, setting affecting the operable printer does not exist in any of the job information A, B, and C. For this reason, all the operable printer lists become the printers 3, 4, 5, and 6. Since there is no print job which cannot be printed by the printer 4, any of the print jobs is not excluded in step S305. In step S306, the schedule is calculated in which execution is made at 14:00 in the order of the print jobs A, B, and C using the printer 6 that is the smallest in power consumption based on the job information A with a print start time of 14:00, for example. In steps S307 to S309, there is no job requiring the starting, so that any of the jobs is not excluded and the print jobs A, B, and C are determined as a print job using printer 4.

In FIG. 13B, since a staple function is specified in the job information C, candidates for printers which can print the print job C are the printers 3 and 5 with the staple function. Therefore, the print job C in which printing cannot be performed by the printer 4 is excluded in step S305. In step S306, the schedule is calculated in which execution is made in the order of the print jobs C, A, and B using the printer 5 that is the minimum in power consumption in the operable printers which can print the print job C at 15:00 based on the job information C. On the other hand, in steps S307 to S309, the printer 5 is smaller in power consumption than the printer 4 as a result of comparing the power consumption between the printers 4 and 5, so that the print jobs A and B are excluded from the print job using the printer 4 in step S309. Accordingly, it is determined that the print jobs A, B, and C are excluded from the printing target using the printer 4.

In FIG. 13C, since a staple function is specified in the job information C, candidate for printers which can print the print job C is the printer 3. Therefore, the print job C which cannot be printed by the printer 4 is excluded in step S305. In step S306, the schedule is calculated in which the print jobs C, A, and B are executed using the printer 3 at 15:00 based on the job information C. On the other hand, in steps S307 to S309, the printer 3 is larger in power consumption than the printer 4 as a result of comparing the power consumption between the printers 4 and 3, so that the print jobs A and B are not excluded. Accordingly, it is determined that the print jobs A and B are the print jobs.

Figure 14:
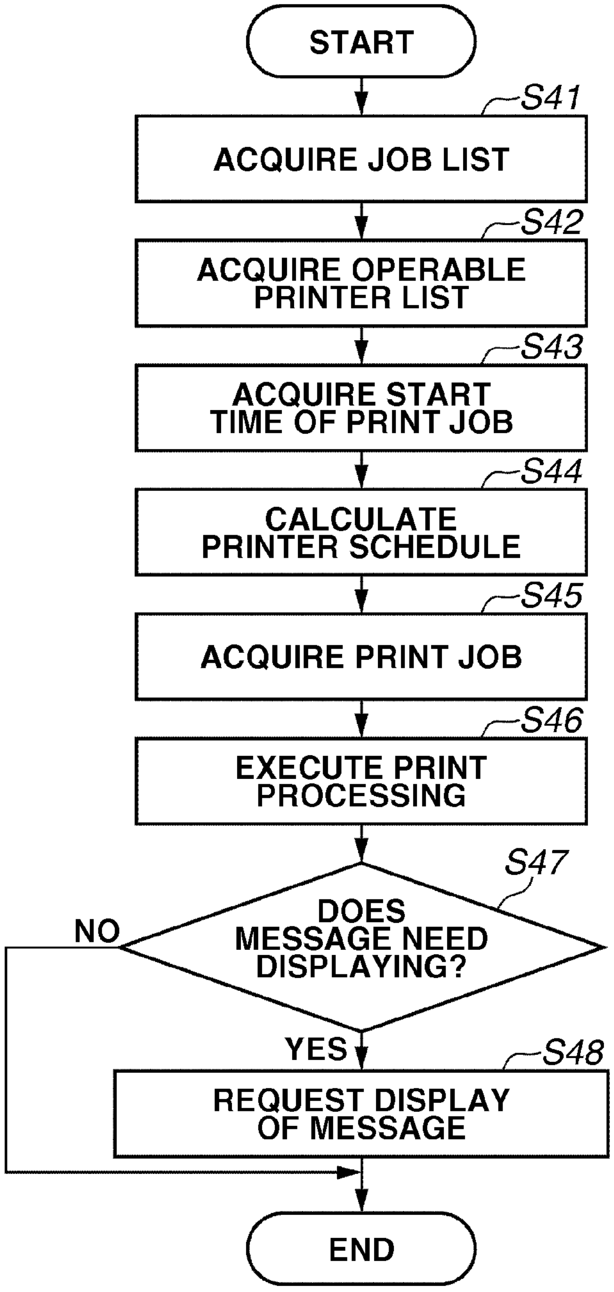
FIG. 14 illustrates an example of a flow chart related to a time print control process.

FIG. 14 illustrates an example of a flow chart related to a time-print control process in which the printer printing control server 2 controls printing when it reaches the print start time of the print job stored in a job list.

In step S41, the job list management unit 207 acquires a job list via the job list storage unit 208 and passes it to the print control unit 209. In step S42, the print control unit 209 refers to the job information of the job list to acquire the printable printer list of each print job. In step S43, the print control unit 209 refers to the job information of the job list to acquire the print start time of each print job. As is the case with step S306, in step S44, the print control unit 209 refers to the job information to calculate the starting time of the printer and the target print job. For example, the print control unit 209 refers to the operable printer list and the print start time of each print job to calculate a starting schedule and the target print job. More specifically, the print control unit 209 calculates a starting schedule for starting a printer so that the number of printers to be started is minimized and the power consumption is minimized in the minimum number of printers by a continuous print processing of a plurality of print jobs.

In step S45, the print control unit 209 refers to the starting time of the printer and the target print job calculated in step S44 to acquire the print job which has reached the print start and the print job which is subsequently printed. In step S46, the print control unit 209 outputs the print job acquired in step S45 to the printer driver 210 corresponding to the printer for output and deletes the print job output from the job list. The printer driver 210 converts the output of the print control unit 209 into the printer control command of the printer which executes printing. The system spooler 211 outputs the printer control command converted by the printer driver 210 to the printer which executes printing via the network 7.

In step S47, the print control unit 209 refers to the print execution notification of the print execution determining information included in the print job to determine whether to perform the notification of a message at the time of executing printing. If the print control unit 209 determines to perform the notification of a message (YES in step S47), the processing proceeds to step S48. If the print control unit 209 determines not to perform the notification of a message (NO in step S47), the print control unit 209 ends the time-print control process.

In step S48, the host communication unit 201 requests the message display unit 107 of the host computer 1 to display the message. The message display unit 107 requested to display the message displays the message (refer to FIG. 10, for example).

In the description of the exemplary embodiment, as illustrated in FIGS. 1 and 3, although the host computer 1 and the printer printing control server 2 exist as different apparatus, the host computer 1 and the printer printing control server 2 may exist on the same apparatus. According to this configuration, the present exemplary embodiment can be realized by a print output system including the host computer 1 and printers.

According to the above exemplary embodiment, a plurality of print jobs is collectively input to a printer at a timing at which any of printers connected to a network is operated to allow reducing the number of times of shifting the operating status of a printer. By setting a standby print job (setting of a finisher), it is determined whether a print job is input into a printer operated this time or a printer operated later if a printer is to be surely operated later, in consideration of power consumption. This configuration allows generally managing the number of times of operation of a printer to further reduce power consumption.

According to the above exemplary embodiments, the number of times of shift of a printer to the standby state can be totally decreased and power consumption can be further reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-009378 filed Jan. 19, 2010, which is hereby incorporated by reference herein in its entirety.

What is claimed is:

1. A printing control apparatus comprising:

a storage unit configured to store information about a plurality of print jobs and a plurality of printing devices in a storage device;

a detection unit configured to detect a shift of an operative state of the plurality of printing devices;

a determination unit configured to determine a print job which matches to a capability of the printing device of which the shift to a standby state is detected, from the plurality of print jobs based on the information about the plurality of print jobs and the printing device stored in the storage device when the shift of any of the printing devices to the standby state is detected by the detection unit; and a print control unit configured to cause the printing device to print the print job determined by the determination unit, wherein the determination unit is configured to determine a print job to be printed by each of the printing device of which the shift to a standby state is detected and another printing device required to be shifted later to the standby state according to another job from the plurality of print jobs, wherein the information about the plurality of printing devices includes information about power consumption of each of the plurality of printing devices and, wherein the determination unit is configured to determine, when the shift of any of the printing devices to the standby state is detected by the detection unit, the print job which the printing device of which the shift to the standby state is detected prints from the plurality of print jobs based on a comparison between information about the power consumption of the printing device of which the shift to the standby state is detected and information about the power consumption of another printing device required to be shifted later to the standby state according to another job.

2. The printing control apparatus according to claim 1, wherein, as a result of comparing the power consumption between a first printing device and another printing device, if the first printing device is larger in power consumption than the other printing device, the print control unit causes the other printing device to print the print job without causing the first printing device to print the print job when the shift of the other printing device to a standby state is detected by the detection unit.

3. The printing control apparatus according to claim 1, further comprising a reception unit configured to receive designation of time at which the printing of the print job is started, wherein the determination unit determines a print job which a first printing device prints, from the plurality of print jobs based on the time received by the reception unit when the shift of the first printing device to a standby state is detected by the detection unit.

4. The printing control apparatus according to claim 1, wherein the print control unit causes a printing device to print the print job determined by the determination unit and transmits information indicating that printing is performed by the printing device to an information processing apparatus instructing the printing of the print job.

5. The printing control apparatus according to claim 1, wherein the storage unit stores the print job in the storage device if the storage unit determines that the printing device which is in the standby state and capable of printing the print job received from the outside does not exist in the plurality of printing devices.

6. A printing control method in a printing control apparatus, the method comprising:

storing information about a plurality of print jobs and a plurality of printing devices in a storage device;

detecting a shift of an operating status of the plurality of printing devices;

determining a print job which matches to a capability of the printing device of which the shift to a standby state is detected, from the plurality of print jobs based on the information about the plurality of print jobs and the printing device stored in the storage device when the shift of any of the printing devices to the standby state is detected; and causing the printing device to print the determined print job, wherein the determining is configured to determine a print job to be printed by each of the printing device of which the shift to a standby state is detected and another printing device required to be shifted later to the standby state according to another job from the plurality of print jobs, wherein the information about the plurality of printing devices includes information about power consumption of each of the plurality of printing devices and, wherein determining, when the shift of any of the printing devices to the standby state is detected, the print job which the printing device of which the shift to the standby state is detected prints from the plurality of print jobs based on a comparison between information about the power consumption of the printing device of which the shift to the standby state is detected and information about the power consumption of another printing device required to be shifted later to the standby state according to another job.

7. A non-transitory computer-readable storage medium for causing a computer to execute a printing control method in a printing control apparatus, the method comprising:

storing information about a plurality of print jobs and a plurality of printing devices in a storage device;

detecting a shift of an operating status of the plurality of printing devices;

determining a print job which matches to a capability of the printing device of which the shift to a standby state is detected, from the plurality of print jobs based on the information about the plurality of print jobs and the printing device stored in the storage device when the shift of any of the printing devices to the standby state is detected; and causing the printing device to print the determined print job, wherein the determining is configured to determine a print job to be printed by each of the printing device of which the shift to a standby state is detected and another printing device required to be shifted later to the standby state according to another job from the plurality of print jobs, wherein the information about the plurality of printing devices includes information about power consumption of each of the plurality of printing devices and, wherein determining, when the shift of any of the printing devices to the standby state is detected, the print job which the printing device of which the shift to the standby state is detected prints from the plurality of print jobs based on a comparison between information about the power consumption of the printing device of which the shift to the standby state is detected and information about the power consumption of another printing device required to be shifted later to the standby state according to another job.

* * * * *